July 5, 1960  R. B. ANNIS  2,943,491
UNDER DRIVE BALANCING MACHINE
Filed March 29, 1955
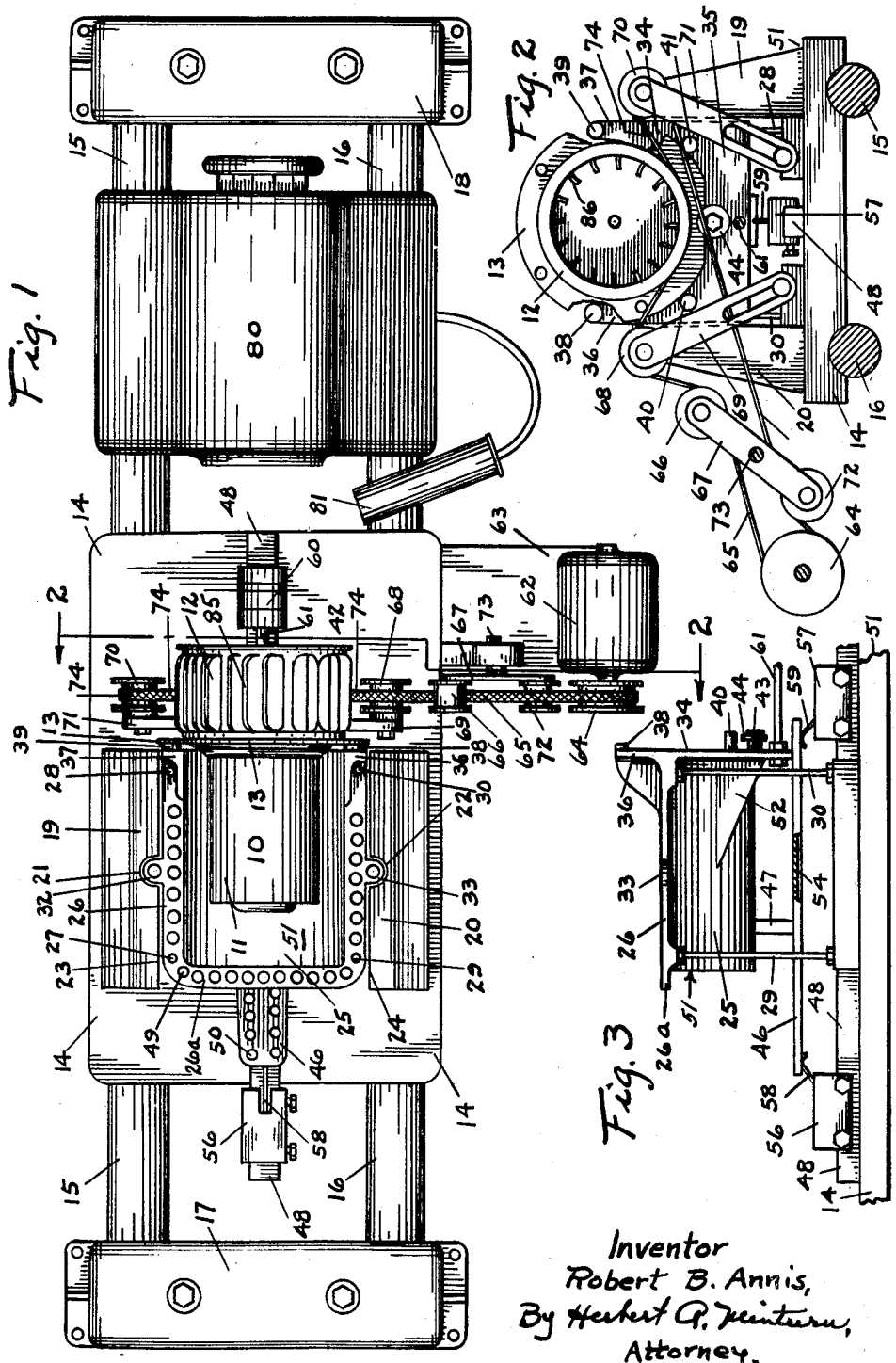
Inventor
Robert B. Annis,
By Herbert P. Minturn,
Attorney.

United States Patent Office 2,943,491
Patented July 5, 1960

2,943,491
UNDER DRIVE BALANCING MACHINE
Robert B. Annis, 1101 N. Delaware St., Indianapolis, Ind.
Filed Mar. 29, 1955, Ser. No. 497,531
3 Claims. (Cl. 73—477)

This invention relates to a balancing machine of the "electronic" type wherein the member to be balanced is supported by a fixture which will reflect out of balance vibration of the member when it is revolved, and furthermore the invention includes a driving system whereby the member to be balanced is simply placed on the fixture and over a driving belt.

The invention is designed to meet high production speeds whereby both the amount and position of the unbalance of the running member are determined through a single quick reading of the "trace" on a cathode ray tube scale and there is the feature of rapid loading of the fixture.

Even though individual components of an assembly may have been pre-balanced, ordinary balancing and mechanical tolerances allow cumulative errors to develop in the assembly. When the asembly is run, quite often there is shown a relatively large unbalance, resulting in vibration and noise. This post-assembly checking eliminates that resultant vibration and noise, and also detects any parts which may have been bent, dropped, or otherwise mishandled during assembly, thus giving through the post-assembly balancing a more uniformly smooth running product.

A single motion places the work piece being balanced on the balancing fixture and at the same time automatically engages the under side of that revolvable member with a driving belt. This method of driving is quite practical for many types of units for the fast production balancing of the assemblies, and it gives constant driving speed, rapid acceleration, and permits a quick stop through the use of electro-dynamic braking on the driving motor.

A primary purpose of the invention is to promote rapid production by means of the use of a minimum number of motions by the operator wherein the unit or work is merely placed on a fixture causing the unit to engage simultaneously and automatically with a belt on the under side of the unit, all in the absence of having to thread or unthread belts, engage and disengage driving couplings, and the like, to the end that there is always a clear working zone over the top side of the driving belt. The mere placing of the unit on the fixture and over the belt establishes not only support of the unit but immediate driving contact with the belt. The belt is always in a driving set up.

The unit is placed on the fixture for balance indication and then removed—just the two steps for automatic belt drive connection and removal. This feature of simply bringing the rotating member of the unit downwardly against the fixed location of a driving belt while the unit is supported in a fixture is of primary importance.

In regard to the electrical system employed in the indication of unbalance and its location on the member being balanced, reference is made to my U.S. Patents Nos. 2,382,843 and 2,420,765.

The present invention involves a fixture receiving the member to be balanced as well as the driving system.

With this in mind, the invention is described in reference to the accompanying drawings, in which Fig. 1 is a view in top plan of a balancer to which my invention is applied;

Fig. 2 is a transverse vertical section on the line 2—2 in Fig. 1; and

Fig. 3 is a view in side elevation and partial section of the fixture and its mounting.

As an example in explaining the invention, the member to be balanced is herein shown as a motor driven blower wheel unit indicated by the numeral 10 and consisting of the drive motor 11 and the blower wheel 12. This unit 10 has a mounting flange 13 which projects laterally from the wheel, between it and the motor as indicated in Fig. 1 and also in Fig. 2. This unit is of the type commonly employed today in automotive heaters, oil burners, and similar equipment wherein balancing is of importance not only to eliminate vibration, but also possible noise.

The machine employed for balancing the unit 10 is very similar to that machine shown in my Patent No. 2,420,765, and has a base 14 mounted to slide along parallel ways 15 and 16 supported between the end frames 17 and 18. There is mounted on this base 14 a pair of spaced apart upwardly extending brackets 19 and 20. The upper ends of these brackets 19 and 20 are notched by semi-circular inlets 21 and 22. These inlets 21 and 22 are substantially centrally disposed along the opposing parallel faces 23 and 24 of these brackets.

A semi-cylindrical shell 25 comprising a fixture is formed to have an outwardly extending top flange 26 extending from two opposite sides and one end of the shell. The end of the shell opposite the transversely extending portion 26a of the flange 26 is left open.

This fixture 25 is supported from the base 14 by means of a plurality of upwardly extending, relatively small diameter rods. A primary characteristic of these rods designated by the numerals 27, 28 on the one side and 29, 30 on the other side is that they support the fixture 25 under the load placed thereon of the unit 10 and at the same time are flexible enough to permit the fixture 25 to move substantially horizontally under unbalance of the unit 10 when the blower wheel 12 is revolved.

As indicated in Fig. 3, these rods have their upper ends engaged with the flange 26 along each side of the member 25, and extend downwardly and engage with the base 14 to be fixed on their respective ends against displacement. These rods also support the member 25 at a distance above the top side of the base 14.

On opposite sides of the side extending portions of the flange 26, there are protruding ears 32 and 33 which are located normally to be loosely and freely positioned within the respective recesses or notches 21 and 22 as indicated in Fig. 1. These ears 32 and 33 serve as limits of permissible travel of the fixture 25 under excessive vibration induced by unbalance of the unit 10.

The front or open end of the fixture 25 is provided with a base plate 34 forming by its upper portion a marginal flange around the opening of the fixture 25 and extending downwardly therefrom by an apron 35. The upper portion of this plate 34 carries upwardly extending brackets 36 and 37 extending above the top face of the flange 26 and carrying thereon respectively the projecting buttons 38 and 39. There is a pair of posts 40 and 41 fixed to and extending from the face of the apron 35 at distances exceeding the projections of the buttons 38 and 39 from the plane of the plate 34. These posts 40, 41 are fixed at common levels and substantially equidistant from the vertical center line of the fixture 25. Below the opening of the fixture 25 which may be designated by the numeral 42 in general, there is centrally positioned a third post 43 on the outer end of which is fixed a washer or plate in the nature of a stop to extend upwardly primarily beyond the top side of the post. This stop is designated by the numeral 44.

A vibrator bar 46 is fixed in relation to the fixture 25 to become in effect an integral member thereof. As shown in Fig. 3, this bar 46 is suspended below the fixture 25 by engaging the under edge of the apron 35, substantially centrally thereof, and extending rearwardly to in turn be fixed to a post 47 extending downwardly from the under side of the fixture 25. This vibrator bar 46 is carried by the fixture 25 to be spaced vertically above and in parallelism with a guide bar 48 which is fixed to extend longitudinally across the base 14. As indicated in Fig. 1, the flange 26 and also the bar 46 are provided with a plurality of holes 49 and 50 respectively as a means for reducing the over-all weight of the assembly of the fixture 25 and the bar 46 with its supporting post 47 all of which constitutes what is termed as the carriage generally designated by the numeral 51. In order to stiffen the forward plate 34 and its apron 35, suitable bracing such as the diagonal gusset plate 52 is employed, this member 52 being an integral portion of the casting comprising the fixture 25 and the plate 34.

The under side of the vibrator bar 46 is provided with a groove or slot 54 which extends centrally of and longitudinally along the entire length of the bar and in its under side.

Any type of transducer units may be used, such as a pair of piezoelectric pick-up units, and are mounted along the guide bar 48, one unit 56 at one end of the carriage 51 and a second unit 57 near the other end of the carriage. These units 56 and 57 are of the well known type which will generate a voltage proportional to lateral vibrations of extending wires 58 and 59 respectively. The lateral direction is that direction which is laterally of the guide bar 48. These units 56 and 57 will initially have to be adjusted along the guide bar 48 with their operating members 58 and 59 bearing upwardly against the vibrator bar 46 within the groove 54, Fig. 3.

The fixture 25 may have its center of mass shifted by means of weights 60 adjustably mounted on a shaft or rod 61 which is fixed to the apron 35 and extends forwardly and away from the fixture 25.

At one side of the platform 14, and preferably removed from connection therewith there is mounted a drive motor 62 on a sub-base 63. The motor 62 carries a driving pulley 64 around which an endless belt 65 wraps. This belt 65, by its top flight, extends from the top side of the pulley 64 in the present showing, under a tensioning pulley 66 carried on a rocker arm 67; up over the top side of a pulley 68 mounted on an arm 69 adjustably fixed to extend from the base 14 to be substantially in front of the upper portion of the bracket 20; thence across to a pulley 70 mounted on an adjustably fixed bracket 71 carried by the base 14 substantially in front of the upper portion of the bracket 19, Fig. 2; from the under side of the pulley 70 back over the top side of a tensioning pulley 72 mounted on the arm 67, the belt passing over that pulley 72 and thence down and around the driving pulley 64. The tensioning arm 67 is mounted on a shaft 73, and suitable tension is placed on the arm 67 by any means such as by a spring or weight (not shown).

A belt flight portion 74 is thus provided to extend at all times between the upper sides of the pulleys 68 and 70 across the opening 42 of the fixture 25. Normally this flight portion 74 will be horizontally or substantially horizontally disposed.

A scanning head is carried within a head stock generally designated by the numeral 80 mounted on the ways 15 and 16. Electrical circuits are carried within the head stock 80 and the resultant output reflecting unbalance of the unit 10 is indicated on the screen of the cathode ray tube 81. These circuits and the scanning device are not herein shown in detail because they follow closely the description thereof in the patents above indicated, and moreover do not constitute a part of the present invention.

The unit 10, one after another as they are to be balanced in production, is picked up by the operator and brought up to the fixture 25 to have the mounting flange 13 rest by its lower edge on the posts 40 and 41 behind the stop 44. The weight of the drive motor 11 tends to tilt the unit to bring the flange 13 backwardly against the buttons 38 and 39 whereby the unit 10 is supported substantially horizontally in respect to its axis of the motor 11 and wheel 12, to have the motor itself entirely free of contact with the fixture 25 and the blower wheel 12 extending forwardly therefrom. In so placing the unit 10, the blower wheel 12 is pressed downwardly on the belt flight 74 to cause that flight 74 to be bowed as indicated in Fig. 2 to give a substantial length of driving contact with the under side of the wheel 12.

The motor 62 is then set into operation which will in turn cause the blower wheel 12 and the armature of the motor 11 to be revolved. It is to be noted that the belt 65 bears against the edges 85 of the louvers or blades 86 positioned around the periphery of the wheel 12. With the blower wheel 12 then turning rapidly, if there be any unbalance, it will be reflected in the units 56 and 57, the outputs of which will be coordinated in the electric system and indicated by the trace appearing at the cathode ray tube 81. The important thing to note herein is that the unbalance of the unit 10 when revolving is reflected in the units 56 and 57.

Therefore it is to be seen that I have provided in my invention an exceedingly simple and yet most effective means for receiving and supporting a revoluble mass of a unit. All that is required is simply to drop the unit in place, drive the belt, note the amount of unbalance, and then remove the unit for balancing or, if not unbalanced, for shipping, or use as the case may be. Normally, there will be provided a cover extending over the entire fixture 25 which will be readily opened and closed, all as a safety measure. For the sake of clearness in showing the invention, the cover is not herein illustrated.

Therefore while I have shown and described my invention in the one particular form, it is obvious that structural variations may be employed without departing from the spirit of the invention, and I therefore do not desire to be limited to that precise form beyond the limitations which may be imposed by the following claims.

I claim:

1. A machine for indicating balance of a unit having a rotatable member carried thereby and extending from the unit, comprising a fixed base; a unit carrying fixture; spaced apart flexible rods supporting the fixture from and above said base permitting horizontal movement of the fixture; fixture carried means detachably receiving and holding said unit in fixed position relative to said fixture; a bar fixed to said fixture and extending therealong in a direction substantially parallel to the axis of said rotatable member; a vibration detector carried by said base and coupled to said bar; a drive belt having a flight extending transversely of said axis adjacent said fixture and against which said rotatable member bears when held by said fixture; means driving the belt; said unit having a stationary portion and a mounting flange between said portion and said rotatable member in a plane normal to said axis; said fixture carried means comprising a base plate extending substantially vertically of the fixture, a pair of spaced apart posts extending from said plate and on which said flange bears by a lower portion; and means retaining said flange on said posts against sliding thereoff.

2. The structure of claim 1 in which said rods are fixed by their upper ends to an upper portion of the said fixture with a major portion of the fixture suspended between the rods, and said bar is fixed to a lowermost portion of the fixture below the axis of said rotatable member.

3. The structure of claim 1 in which there is a counterweight adjustably extensible from the base plate side of said fixture in a path approximately in alignment with said bar.

References Cited in the file of this patent

UNITED STATES PATENTS

| | | |
|---|---|---|
| 1,078,402 | Altorfer | Nov. 11, 1913 |
| 2,088,553 | Olsen | July 27, 1937 |
| 2,131,602 | Thearle | Sept. 27, 1938 |
| 2,174,665 | Livingston | Oct. 3, 1939 |
| 2,348,922 | Pekar | May 16, 1944 |
| 2,382,843 | Annis | Aug. 14, 1945 |
| 2,451,863 | Oakley | Oct. 19, 1948 |
| 2,514,293 | Rumsey | July 4, 1950 |
| 2,534,268 | Kahn et al. | Dec. 19, 1950 |
| 2,663,184 | Merrill et al. | Dec. 22, 1953 |
| 2,758,487 | Erickson | Aug. 14, 1956 |